United States Patent Office 3,280,098
Patented Oct. 18, 1966

3,280,098
PROCESS OF PRODUCING PEPTIDES AND PRODUCTS OBTAINED THEREBY
Hideo Otsuka, Toyonaka-shi, Osaka Prefecture, and Ken Inouye, Kashio, Takarazuka-shi, Hyogo Prefecture, Japan, assignors to Shionogi & Co., Ltd., Higashi-ku, Osaka-shi, Japan
No Drawing. Filed Feb. 5, 1962, Ser. No. 171,276
Claims priority, application Japan, Feb. 18, 1961, 36/5,441
20 Claims. (Cl. 260—112.5)

The present invention relates to a process of producing histidine peptides (peptides containing histidine residue in the molecule). More particularly, it relates to histidine-introducing agents useful in the synthesis of histidine peptides, especially peptides containing histidine residue at the carboxyl end or in the middle of the molecule, and production and utilization thereof.

The process of the present invention is generically outlined in the following reaction scheme:

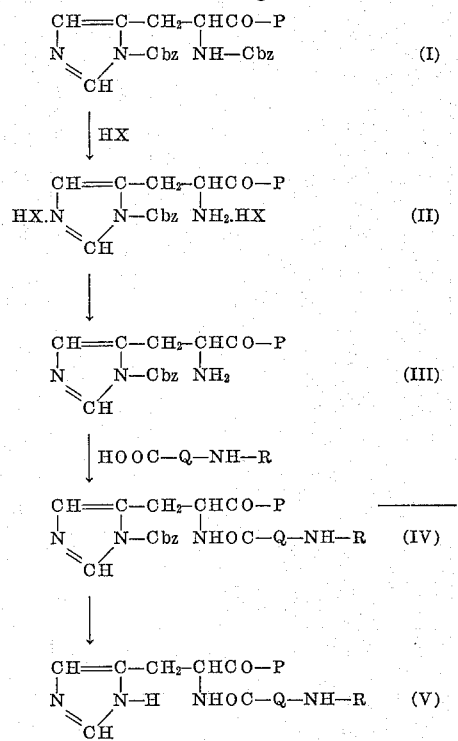

In the foregoing reaction scheme, Cbz represents a carbobenzoxy ($—CO—O—CH_2—C_6H_5$), X represents a halogen (e.g., —Cl, —Br, —I, etc.), P represents a lower alkoxy (e.g., $—OCH_3$, $—OC_2H_5$, $—OC_3H_7$, etc.), a substituted or unsubstituted phenyl(lower)alkoxy (e.g., $—O—CH_2—C_6H_5$, $—O—CH_2—C_6H_4—NO_2$—p, etc.) or a radical represented by the formula:

$$—NH—Q''—CO—P'$$

P′ represents a lower alkoxy (e.g., $—OCH_3$, $—OC_2H_5$, $—OC_3H_7$, etc.) or a substituted or unsubstituted phenyl (lower)alkoxy (e.g., $—O—CH_2—C_6H_5$,

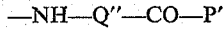

etc.), Q, Q′, and Q″ represent an amino acid residue or a peptide residue and R and R′ represent an amino protecting group (e.g., $—CO—O—CH_2—C_6H_5$,

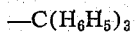
etc.).

In this connection, it should be understood that the reaction scheme shows the substantial order of the process of the present invention, modifications and equivalents—including possible detours—being omitted. Thus, any carboxyl and/or other functional radicals in the amino acid or peptide are intended also to represent such radicals properly changed or protected, when necessary, although—for the sake of simplicity—such radicals are shown only in unchanged or unprotected form in the reaction scheme. In other words, the showing of a carboxyl radical is intended to represent a free carboxyl or a reactively changed carboxyl (e.g., —CO—Cl, $—CO—N_3$, $—CO—O—CO—OC_2H_5$,

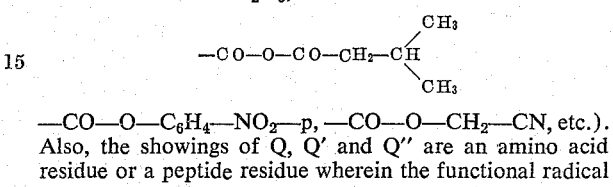

$—CO—O—C_6H_4—NO_2$—p, $—CO—O—CH_2—CN$, etc.). Also, the showings of Q, Q′ and Q″ are an amino acid residue or a peptide residue wherein the functional radical may be partially or completely protected or unprotected. For instance, the alcoholic radical in tyrosine residue may be protected as benzyloxy ($—O—CH_2—C_6H_5$), the thiol radical in cysteine residue as benzylthio $$(—S—CH_2—C_6H_5)$$

the amino radical in lysine residue and ornithine residue as carbobenzoxyamino $$(—NH—CO—O—CH_2—C_6H_5)$$

tritylamino ($—NH—C(C_6H_5)_3$), tosylamino $$(—NH—SO_2—C_6H_4—CH_3—p)$$

formylamino (—NH—CHO) or t-butyloxycarbonylamino ($—NH—CO—O—C(CH_3)_3$), the guanidyl radical in arginine residue as nitroguanidyl

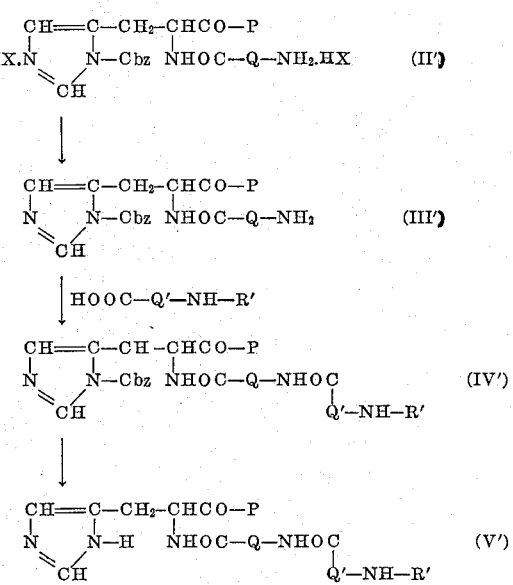

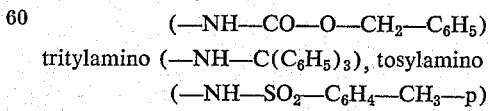

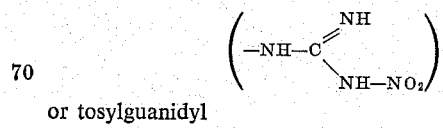

or tosylguanidyl

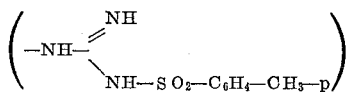

and the carboxyl radical in glutamic acid residue and aspartic acid residue as methoxycarbonyl $$(-CO-O-CH_3)$$

t-butoxycarbonyl ($-CO-O-C(CH_3)_3$) or benzyloxycarbonyl ($-CO-O-CH_2-C_6H_5$). Furthermore, the said protecting group may be eliminated in the course of the process of the present invention. But such elimination is not substantial in the present invention and is omitted in the reaction scheme. Thus, the protected form is also intended to represent the unprotected form, inclusively. The said protection and the subsequent elimination of the protecting group may be effected by ordinary methods known to those skilled in the art.

The abbreviations $N(\alpha)$ and $N(Im)$ herein employed represent the nitrogen atom in the $\alpha$-amino radical of histidine and the active nitrogen atom in the imidazole nucleus of histidine, respectively.

Histidine occurs widely in biologically active proteins and peptides such as ribonuclease, insulin, corticotropin, melanocyte-stimulating hormone (MSH) and hypertensin. Since it has recently been suggested that in some instances the histidine residue occupies a site of the biological activity, the development of methods for the synthesis of histidine peptides is very desirable for nutritional purposes and biochemical studies on the proteins and peptides.

In recent years, it has been reported that $N(\alpha),N(Im)$-dicarbobenzoxy-L-histidine is an excellent starting material in the synthesis of histidyl peptides (Akabori et al.: Nature, 181, page 772 (1958); Sakiyama et al.: Bull. Chem. Soc. Japan, 31, page 926 (1958)). Thus, the peptide containing a histidine residue at the amino end of the molecule has been obtainable in an excellent yield without any difficulties. On the other hand, it is rather troublesome to prepare the peptide containing a histidine residue at the carboxyl end or in the middle of the molecule. This is mainly due to the fact that there have been lacking simple and satisfactory methods to protect selectively the $N(Im)$ atom. In this respect, $N(Im)$-benzyl-L-histidine and its derivatives are valuable intermediates (Du Vigneaud et al.: J. Biol. Chem., 117, page 27 (1937); Cook et al.: J. Chem. Soc., page 1061 (1949); Overell et al.: J. Chem. Soc., page 232 (1955); Theodoropoulos: J. Org. Chem., 21, page 1550 (1956)), but those are not easily accessible enough to be used for practical purposes. Of late, $N(Im)$-trityl-L-histidine methyl ester hydrochloride is obtained by heating a methanolic solution of dritryl-L-histidine methyl ester hydrochloride (Stelakatos et al.: J. Am. Chem. Soc., 81, page 2884 (1959)). This compound may, however, be useful only for limited cases, because of its labile nature.

The inventors have now discovered that a carbobenzoxy group linked at the $N(Im)$ atom is unexpectedly resistant to treatment with hydrogen halide in a suitable organic solvent under the normal decarbobenzoxylation conditions. Thus, the treatment of the $N(\alpha),N(Im)$-dicarbobenzoxy compound of Formula I with the acid reagent affords the corresponding $N(Im)$-carbobenzoxy compound dihydrohalide of Formula II. The latter may be converted into the corresponding $N(Im)$-carbobenzoxy compound of Formula III and used as a histidine-introducing agent in the synthesis of histidine peptides, especially peptides containing histidine residue at the carboxyl end or in the middle of the molecule.

It is advantageous that the $N(\alpha),N(Im)$-dicarbobenzoxy compound I can be converted into the corresponding $N(Im)$-carbobenzoxy compound dihydrohalide II and further into the corresponding $N(Im)$-carbobenzoxy compound of Formula III in excellent yields according to the process of the present invention. It is also advantageous that the use of the $N(Im)$-carbobenzoxy compound III as a histidine-introducing agent can minimize the contamination of the resultant $N(Im)$-carbobenzoxy-histidine peptide of Formula IV with the by-product. It is another advantage that the resultant $N(Im)$-carbobenzoxy-histidine peptide IV shows in general relatively high solubilities and can be easily crystallized from organic solvents. A further advantage of the present invention is that the $N(Im)$-carbobenzoxy group in the resultant $N(Im)$-carbobenzoxy-histidine peptide IV can be easily eliminated by treatment with alkali or catalytic reduction to afford the histidine peptide of Formula V.

Accordingly, a basic object of the present invention is to provide the $N(Im)$-carbobenzoxy compound III and its dihydrohalide II useful as histidine-introducing agents in the synthesis of histidine peptides and production thereof. Another object is to provide a novel process for producing the peptides containing histidine residue at the carboxyl end or in the middle of the molecule. Another object is to provide a process for producing histidine peptides in excellent yields and high purities. A further object is to provide a process for protecting selectively the $N(Im)$ atom of histidine. These and other objects and the manner in which they are accomplished will become apparent to those conversant with the art from the following description of the general class of compounds and the several specific examples and methods of obtaining them presented.

The starting material of the present invention is the $N(\alpha),N(Im)$-dicarbobenzoxy compound I and may be prepared by a conventional manner (Sakiyama et al.: Bull. Chem. Soc. Japan, 31 page 926 (1958)). The carboxyl end of the starting material should be protected as the form of ester, such as lower alkyl ester (e.g., methyl ester, ethyl ester, etc.) and substituted or unsubstituted phenyl(lower)alkyl ester (e.g., benzyl ester, p-nitrobenzyl ester, etc.) in order to utilize effectively the $N(Im)$-carbobenzoxy compound III or its dihydrohalide II in the following peptidation (peptide bond formation). The said protecting ester can be eliminated by a simple operation after the accomplishment of the peptidation. For instance, there may be adopted the alkali treatment operation at a lower temperature (0 to 40° C.), in the case of lower alkyl ester, or the catalytic reduction procedure, in the case of substituted or unsubstituted phenyl(lower) alkyl ester. The other reactive functional group in the starting compound, when it affords a serious effect on the proceeding of the following peptidation, may be also blocked by a conventional manner prior to the application of the present invention.

The $N(\alpha),N(Im)$-dicarbobenzoxy compound I can be treated with a hydrogen halide such as hydrogen chloride, hydrogen bromide and hydrogen iodide (preferably hydrogen bromide) in the an inert organic solvent such as dioxane, glacial acetic acid, diethyl phosphite, methanol and ethanol (preferably dioxane or glacial acetic acid) at a temperature between 0 and 40° C. (preferably 15 and 30° C.) to afford the corresponding $N(Im)$-dicarbobenzoxy compound dihydrohalide II. Although the reaction can be executed under ice-cooling or heating, the yield of the product in such case may be decreased. The reaction is required to be carried out in substantially anhydrous medium, because the presence of water causes the simultaneous decomposition of the ester bond protecting the carboxyl end and, when contained, the peptide linkages. Accordingly, the organic solvent employed should be substantially water-free, and also the acid reagent may be prepared by inspiring a gaseous hydrogen halide into an organic solvent under exclusion of atmospheric moisture.

The thus-obtained $N(Im$-carbobenzoxy compound dihydrohalide II is stable in dry state, and suitable for storage. For the utilization of the $N(Im)$carbobenzoxy compound dihydrohalide II as a histidine-introducing agent, it is necessary to eliminate the hydrohalide by treating with a basic substance prior to the use. Although the elimination can be readily executed by neutralizing the N(Im)-carbobenzoxy compound dihydrohalide II with alkali, the operation causes undesirably the simultaneous elimination of the N(Im)-carbobenzoxy group and the product in the following peptidation is contaminated with impurities. Accordingly, it is preferred that the neutralization is carried out by shaking the N(Im)-carbobenzoxy compound dihydrohalide II with alkali in the presence of a water-immiscible organic solvent, the produced N(Im)-carbobenzoxy compound III being retained in the said solvent instantly after the elimination of the hydrohalide without the undesirable decomposition. As the solvent employed, there may be exampled dichloromethane, chloroform, ethyl acetate and the like. The use of dichloromethane is especially preferred in relatively lower boiling point and solvency. As the alkali may be used ammonia water, sodium bicarbonate and the like. Alternatively, a tertiary amine such as triethylamine, tri-n-butylamine and pyridine may be employed as the eliminating agent of the hydrohalide. In such case, the solution or suspension of N(Im)-carbobenzoxy compound dihydrohalide II in an inert organic solvent such as dichloromethane, chloroform, ethyl acetate, dioxane, tetrahydrofuran and dimethylformamide may be treated with an equivalent amount of the tertiary amine.

The thus-prepared solution of the N(Im)-carbobenzoxy compound III is an organic solvent may be actually used as the histidine-introducing agent in the synthesis of histidine peptides, especially peptides containing histidine residue at the carboxyl end or in the middle of the molecule.

The utilization process substantially consists of two steps, i.e., the peptidation (peptide bond formation) and the elimination of the N(Im)-carbobenzoxy group.

The peptidation can be accomplished by an ordinary procedure. Thus, the N(Im)-carbobenzoxy compound III may be treated with an amino acid or a peptide in an organic solvent at a temperature between 0 and 40° C. to afford the N(Im)-carbobenzoxy-histidine peptide of Formula IV. In the used amino acid or peptide, the carboxyl end may be previously changed to the reactive functional radical such as carboxylic halide, carboxylic azide, carboxylic anhydride and carboxylic thioester, but such changes are unnecessary when a suitable condensing agent is employed. The amino end of the same should be protected, for instance, as tosylamino or carbobenzoxyamino of which the elimination after the peptidation can be easily executed by treatment with metallic sodium in liquid ammonia, in case of tosylamino, or hydrogenation in the presence of palladium catalyst or treatment with hydrogen bromide in glacial acetic acid or dioxane, in case of carbobenzoxyamino. The other reactive functional group in he amino acid or peptide, when it affords a serious effect on the proceeding of the peptidation, may be also blocked by a conventional manner. In general, the reaction is carried out by merely allowing to stand the mixture of the N(Im)-carbobenzoxy compound III with the amino acid or the peptide wherein the carboxyl end is free in the presence of a condensing agent such as dicyclohexylcarbodiimide

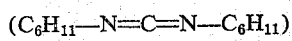

carbonyldiimidazole

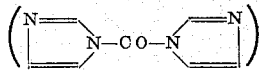

and tetraethylpyrophosphite

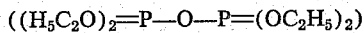

in a suitable organic solvent such as dichloromethane, dioxane, tetrahydrofuran, dimethylformamide, ethyl acetate and diethyl phosphite at a temperature between 0 and 40° C. (preferably 15 and 30° C.), if necessary, while stirring.

The elimination of the N(Im)-carbobenzoxy group from the N(Im)-carbobenzoxy-histidine peptide IV giving the histidine peptide of formula V can be attained by treatment with alkali such as alkali metal hydroxide (e.g., NaOH, KOH, etc.) and alkali metal carbonate (e.g., $Na_2CO_3$, $K_2CO_3$, etc.) or by the catalytic reduction using palladium catalyst. In either case, the reaction can be accomplished at a temperature between 0 and 40° C. (preferably 15 and 30° C.). In the said elimination procedure, the removal of the protecting group susceptible to alkaline hydrolysis or hydrogenolysis may simultaneously take place. For instance, the methyl, ethyl or benzyl ester protecting the carboxyl end is split off by the alkali treatment and the carbobenzoxy or trityl radical protecting the amino end is split off by the catalytic reduction.

The above-obtained N(Im)-carbobenzoxy-histidine peptide IV may be also employed as a histidine-introducing agent, when the protecting group at the amino end is a susceptible radical to an acid reagent, such as carbobenzoxy, trityl and t-butyl-oxycarbonyl. Thus, the N(Im)-carbobenzoxy-histidine peptide IV is treated with hydrogen halide (preferably hydrogen bromide) in an inert organic solvent (preferably dioxane or glacial acetic acid) to eliminate selectively the protecting group of the amino end and the resultant N(Im)-carbobenzoxy-histidine peptide dihydrohalide II' is shaken with alkali in the presence of a water-immiscible organic solvent (preferably dichloromethane) to prepare the solution of the N(Im)-carbobenzoxy-histidine peptide of formula III' in the said organic solvent. The thus-prepared N(Im)-carbobenzoxy-histidine peptide III' is subjected to the peptidation with an amino acid or a peptide and then the elimination of the N(Im)-carbobenzoxy group in the same manner as stated above. Repeating the procedures in these steps, there may be produced the polypeptides containing histidine residue. Such repetition may be obvious to those skilled in the art in light of the disclosure as stated above.

Although the process of the present invention is hereinbefore illustrated step by step, these steps may be executed successively without the isolation of the product in each step. A suitable purification operation obvious to those skilled in the art may be also conducted in the course of those steps.

The new process as claimed hereinafter represents a remarkable improvement over the prior art processes of making histidine-peptides and, therefore, will be of great value in the ultimate synthesis of protein-like compounds. The new compounds obtained thereby represent valuable intermediates in the synthesis of such protein-like compounds and may be used as such or after splitting off the N(Im)-carbobenzoxy group for nutritional purposes, for instance, in place of protein hydrolysates. They permit the administration of very definite and specific peptides to overcome certain amino acid deficiencies and are of considerable advantage over such protein hydrolysates because they allow proper and precise dosage. The peptides can, of course, also be used for technical purposes in place of protein hydrolysates and the like.

The following examples serve to illustrate the present invention without, however, limiting the same thereto. More particularly, changes and variations in the nature of the solvents and the reaction components, the order of introducing the reactants into the reaction solution, the reaction temperature and duration, the manner of working up the reaction mixture and of isolating and purifying the reaction product may be made by those skilled in the art in accordance with the principles set forth herein and in the claims annexed hereto. Still, the following Examples 1 to 5 relating to the preparations of the starting materials employed in the present invention are disclosed for convenience and should not be understood to be our invention. Furthermore, it is obvious to those skilled in the art without any inventive conception that D- or DL-amino acid can be employed in place of L-amino acid in the following examples, and such substitution should be understood to be within the scope of the present invention.

In the following examples, all temperatures are expressed in degrees centigrade (° C.) and the abbreviation M.P. is intended to mean melting point. The percent (%) is by weight per volume unless accompanied with a special note.

EXAMPLE 1

*Preparation of N(α),N(Im)-dicarbobenzoxy-L-histidine.*—To a solution of 8.38 grams of L-histidine monohydrochloride monohydrate in 20 millilitres of 4 N sodium hydroxide, there are added 42.4 millilitres of 5% sodium carbonate and 30 millilitres of dioxane. To the resultant solution cooled in an ice-bath, there are added 14.35 grams of benzyl chloroformate and 21 millilitres of 4 N sodium hydroxide in five equal portions within 40 minutes while stirring. The mixture is stirred for additional 20 minutes at 0 ° C. The sodium salt of the product is often separated as a crystalline precipitate. After about 100 millilitres of ethyl acetate are added, the reaction mixture is acidified with 6 N hydrochloric acid. The aqueous phase is extracted twice with ethyl acetate. The extracts are combined with the above-separated organic solvent phase and concentrated in vacuo. The resultant syrup is redissolved in ethyl acetate. The solution is washed with water, dried over sodium sulfate and concentrated in vacuo at 30° C. to about 20 millilitres. Scratching under refrigeration below −10° C. causes to separate the product in a crystalline state. After addition of 50 to 60 millilitres of anhydrous ether, the crystal is collected by filtration, washed with anhydrous ether and dried. Yield, 12.78 grams. M.P. 87 to 90° C. (dec.). Recrystallization from ethyl acetate-ether gives lustrous granules; M.P. 90.5 to 92° C. (dec.), $$[\alpha]_D^{19} + 29.1 \pm 0.1°$$

(c, 1.655 in ethyl acetate), $$\lambda_{max.}^{methanol} = 238 \ m\mu \ (\epsilon = 3,600)$$

Soluble in ethyl acetate, chloroform; slightly in ether; insoluble in petroleum ether, water.

*Analysis.*—Calcd. for $C_{22}H_{21}N_3O_6$: C, 62.5; H, 5.01; N, 9.93. Found: C, 62.17; H, 5.06; N, 9.86.

This crystal is also readily soluble in methanol and from the solution is soon separated a second form of crystal in fine needles which has one molecule of methanol; M.P. 105 to 107° C. (dec.), $[\alpha]_D^{21} + 13.5 \pm 2°$ (c, 1.025 in methanol-acetone (1:4) by volume).

*Analysis.*—Calcd. for $C_{22}H_{21}N_3OH$: C, 60.8; H, 5.55; N, 9.25. Found: C, 60.67; H, 5.50; N. 9.39.

EXAMPLE 2

*Preparation of N(α),N(Im)-dicarbobenzoxy-L-histidine methyl ester hydrochloride.*—To 40 millilitres of absolute methanol previously cooled below −10° C., there are added 0.78 millilitre of thionyl chloride and 4.23 grams of N(α),N(Im)-dicarbobenzoxy-L-histidine. The resulting clear solution is stirred for 3 hours and, upon standing overnight at 0° C., the product is separated as colorless needles. To complete separation, 40 millilitres of anhydrous ether are added and, after refrigeration, the crystal is collected by filtration and washed with methanol-ether (1:2) and with ether. Yield, 3.20 grams. M.P. 121.5 to 122.5° C. (dec.). $[\alpha]_D^{21} - 20.0 \pm 2°$ (c, 3.073 in methanol).

*Analysis.*—Calcd. for $C_{23}H_{24}N_3O_6Cl$: C, 58.3; H, 5.11; N, 8.87; Cl, 7.49. Found: C, 58.38; H, 5.09; N, 9.05; Cl, 7.39.

From the mother liquor, there is obtained additional 0.57 gram of the crystal which has M.P. 116° C. (dec.) after recrystallization from methanol-ether.

EXAMPLE 3

*Preparation of N(α),N(Im)-dicarbobenzoxy-L-histidyl-L-phenylalanine methyl ester.*—A suspension of 1.30 grams of L-phenylalanine methyl ester hydrochloride in 40 millilitres of ether is cooled in an ice-salt bath and shaken vigorously with 12 millilitres of ice-cold 50% potassium carbonate. The aqueous phase is once extracted with ether. The ether extract is combined with the above-separated organic solvent phase and dried over sodium sulfate at 0° C. After removal of the solvent in vacuo, the resulting oil is dissolved in 20 millilitres of dichloromethane. To this solution, there are added 2.12 grams of N(α),N(Im)-dicarbobenzoxy-L-histidine and 1.03 grams of N,N'-dicyclohexylcarbodiimide. The mixture is allowed to stand overnight at a room temperature (15 to 30° C.) and then refrigerated. Dicyclohexylurea is filtered off. The filtrate is washed with N hydrochloric acid, water, ice-cold 5% sodium bicarbonate and water in order and dried over sodium sulfate. Concentration in vacuo gives a clear syrup which is then dissolved in 20 millilitres of ethyl acetate. Upon addition of 20 millilitres of ether, silky needles are slowly separated. After refrigeration overnight, the crystal is collected by filtration, washed with ether and dried. Yield, 2.61 grams. M.P. 135.5 to 136° C. Recrystallization does not alter the M.P., $[\alpha]_D^{29} + 54.5 \pm 0.7°$ (c, 3.261 in chloroform).

*Analysis.*—Calcd. for $C_{32}H_{32}N_4O_7$: C, 65.8; H, 5.52; N, 9.60. Found: C, 65.59; H, 5.54; N, 9.60.

EXAMPLE 4

*Preparation of N(α),N(Im)-dicarbobenzoxy-L-histidyl-L-phenylalanine benzyl ester.*—In 70 millilitres of acetonitrile with 3.10 grams of N,N'-dicyclohexylcarbodiimide, 6.35 grams of N(α),N(Im)-dicarbobenzoxy-L-histidine and L-phenylalanine benzyl ester (prepared from 5.25 grams of the hydrochloride as in Example 3) are dissolved. The reaction mixture is stirred for 5 hours and, upon standing overnight at a room temperature (15 to 30° C.), the whole is solidified. The solvent is removed by suction and the crystalline residue is washed three times with acetonitrile and dissolved in about 60 millilitres of hot acetonitrile. The insoluble dicyclohexylurea is filtered off and the filtrate is diluted with 80 millilitres of ethyl acetate and refrigerated. The crystal is collected by filtration (6.37 grams, M.P. 125.5 to 126.5° C.) and the filtrate is concentrated at 35° C. in vacuo. The residence is redissolved in ethyl acetate, washed with N hydrochloric acid, water, 5% sodium bicarbonate and water in order, dried over sodium sulfate and concentrated to afford crystals (2.55 grams, M.P. 124 to 125.5° C.). Total yield, 8.92 grams. Recrystallization from ethyl acetate-ether (3:5) gives 8.70 grams of colorless needles; M.P. 126 to 127° C., $[\alpha]_D^{28} - 7.2 \pm 0.1°$ (c, 1.720 in methanol). Readily soluble in chloroform, hot ethyl acetate; soluble in ethyl acetate, methanol; slightly in ether, acetonitrile; insoluble in petroleum ether, water.

*Analysis.*—Calcd. for $C_{38}H_{36}N_4O_7$: C, 69.1; H, 5.47; N, 8.49. Found: C, 68.98; H, 5.68; N, 8.49.

EXAMPLE 5

*Preparation of N(α),N(Im)-dicarbobenzoxy-L-histidyl-L-leucine methyl ester.*—1.45 grams of N(α),N(Im)-dicarbobenzoxy-L-histidine and L-leucine methyl ester (prepared from 0.76 gram of the hydrochloride as in the case of L-phenylalanine methyl ester) are coupled in dichloromethane by 0.72 gram of N,N'-dicyclohexylcarbodiimide as in Example 3 to afford 1.70 grams of the peptide. M.P. 102 to 103.5° C. Recrystallization from ethyl acetate-ether gives silky needles having M.P. of 102.5 to 103.5° C., $[\alpha]_D^{18} - 7.6 \pm 2°$ (c, 3.327 in methanol), $[\alpha]_D^{28} + 14.1 \pm 0.6°$ (c, 3.089 in ethyl acetate).

*Analysis.*—Calcd. for $C_{29}H_{34}N_4O_7$: C, 63.3; H, 6.23; N, 10.17. Found: C, 64.01; H, 6.23; N, 10.54.

EXAMPLE 6

*Preparation of N(Im)-carbobenzoxy-L-histidine methyl ester dihydrobromide.*—To 1.14 grams of N(α),N(Im)-dicarbobenzoxy-L-histidine methyl ester hydrochloride, there are added 6 millilitres of 40.4% (by weight) hydrogen bromide in dioxane, and the resultant mixture is allowed to stand at a room temperature (15 to 30° C.). After the 15 minutes evolution of carbon dioxide is accomplished, 30 millilitres of anhydrous ether are added. The deposited oil is soon solidified. The solid is washed with ether and then dichloromethane and dried. Yield, 1.05 grams. M.P. 167 to 167.5° C. (dec.).

$$\lambda_{max.}^{methanol} = 234 \ m\mu \ (\epsilon = 3,140)$$

Soluble in methanol, water; insoluble in dichloromethane, ethyl acetate, ether.

*Analysis.*—Calcd. for $C_{15}H_{19}N_3O_4Br_2$: C, 38.75; H, 4.12; N, 9.04; Br., 34.4. Found: C, 37.23; H, 4.44; N, 9.43; Br, 35.03.

EXAMPLE 7

*Preparation of N(Im)-carbobenzoxy-L-histidyl-L-leucine methyl ester dihydrobromide.*—A mixture of 0.55 gram of $N(\alpha),N(Im)$-dicarbobenzoxy-L-leucine methyl ester in 3 millilitres of 37.5% (by weight) hydrogen bromide in dioxane is allowed to stand at a room temperature (15 to 30° C.) for 30 minutes. Upon addition of 20 millilitres of anhydrous ether, an oil is deposited and soon solidified. The precipitate is washed with ether and dried. Yield, 0.55 gram. M.P. 95° C. (dec.). Soluble in methanol, dichloromethane, water; insoluble in ethyl acetate, ether.

*Analysis.*—Calcd. for $C_{21}H_{30}N_4O_5Br_2$: C, 43.7; H, 5.23; N, 9.70; Br, 27.7. Found: C, 40.94; H, 5.60; N, 10.62; Br, 27.91.

EXAMPLE 8

*Preparation of N(Im)-carbobenzoxy-L-histidyl-L-phenylalanine methyl ester dihydrobromide.*—0.585 gram of $N(\alpha), N(Im)$-dicarbobenzoxy-L-histidyl-L-phenylalanine methyl ester is combined with 3 millilitres of 37.5% (by weight) hydrogen bromide in dioxane and allowed to stand at room temperature (15 to 30° C.). As soon as the crystalline precipitate starts to separate, the whole reaction mixture is solidified. After 30 minutes, the crystal is collected by filtration with the aid of 15 millilitres of ether, washed with dichloromethane and then ether and dried. Yield, 0.60 gram. Colorless needles. M.P. 133 to 134° C. (dec.).

$$\lambda_{max.}^{methanol} = 234 \ m\mu \ (\epsilon = 3,300)$$

Soluble in methanol, water; slightly in dichloromethane; insoluble in ethyl acetate, ether.

*Analysis.*—Calcd. for $C_{24}H_{28}N_4O_5Br_2$: C, 47.15; H, 4.61; N, 9.15; Br, 26.15. Found: C, 46.87; H, 4.75; N, 9.05, Br, 26.26.

When the treatment is carried out with 29.3% (by weight) hydrogen bromide is glacial acetic acid, the same product is obtained as fine needles in a 99.3 percent yield.

EXAMPLE 9

*Preparation of N(Im)-carbobenzoxy-L-histidyl-L-phenylalanine benzyl ester dihydrobromide.*—A mixture of 2.98 grams of $N(\alpha),N(Im)$-dicarbobenzoxy-L-histidyl-L-phenylalanine benzyl ester with 15 millilitres of 35% (by weight) hydrogen bromide in dioxane is allowed to stand at a room temperature (15 to 30° C.) for 30 minutes. The crystalline precipitate is collected by filtration, washed with ether and dried. Yield, 3.08 grams. M.P. 127 to 127.5° C. (dec.).

*Analysis.*—Calcd. for $C_{30}H_{32}N_4O_5Br_2$: C, 52.3; H, 4.69; N, 8.15; Br, 23.25. Found: C, 53.75; H, 5.09; N, 8.59; Br, 23.61.

A suspension of 10.02 grams of the above-obtained N(Im)-carbobenzoxy-L histidyl- L -phenylalanine benzyl ester dihydrobromide in 100 millilitres of dichloromethane is cooled in an ice-bath and shaken with 30 millilitres of 3 N ammonia at 0° C. The aqueous phase is twice extracted with dichloromethane and the extracts are combined with the organic solvent phase. The dichloromethane solution is concentrated at 20° C. in vacuo and the residue is redissolved in 100 millilitres of ethyl acetate. Adding 30 millilitres of ice-cold N hydrochloric acid to the resultant solution, there is separated N(Im)-carbobenzoxy-L-histidyl-L-phenylalanine benzyl ester monohydrochloride monohydrate as needles. Yield, 7.13 grams. M.P. 136.5 to 137° C. (dec.).

$$\lambda_{max.}^{methanol} = 246 \ m\mu \ (\epsilon = 3,390)$$

Soluble in methanol, cold dichloromethane; slightly in ethyl acetate, water; insoluble in ether.

*Analysis.*—Calcd. for $C_{30}H_{30}N_4O_5.HCl.H_2O$: C, 62.1; H, 5.38; N, 9.66; Cl, 6.11. Found: C, 61.90; H. 5.65; N, 9.90; Cl, 5.84.

EXAMPLE 10

*Preparation of carbobenzoxy-glycyl-N(Im)-carbobenzoxy-L-histidine methyl ester.*—To a solution of 1.03 grams of N(Im)-carbobenzoxy-L-histidine methyl ester dihydrobromide in 20 millilitres of dichloromethane and 10 millilitres of water, there is added 1 millilitre of 28% ammonia water with vigorous shaking at 0° C. The aqueous phase is saturated with sodium chloride and then extracted with dichloromethane. The extract is combined with the organic solvent phase, dried over sodium sulfate at 0° C. and concentrated to a small volume in vacuo. To the condensate, there are added 0.42 gram of carbobenzoxyglycine and 0.41 gram of N,N'-dicyclohexylcarbodiimide and the total volume is made to 20 millilitres by adding dichloromethane. The reaction mixture is allowed to stand at a room temperature (15 to 30° C.) overnight and then refrigerated. After removal of the separated dicyclohexylurea, the filtrate is concentrated in vacuo and the residue is dissolved in ethyl acetate. The resultant solution is cooled in an ice-bath, washed with ice-cold N hydrochloric acid, 5% sodium bicarbonate and then water, dried over sodium sulfate, and evaporated to a syrup, which is crystallized from ethyl acetate-petroleum ether. Yield, 0.84 gram. M.P. 74 to 75.5° C. Recrystallization from ethyl acetate-ether gives fine rods without changing the M.P., $[\alpha]_D^{20} + 3.0 \pm 0.5°$ (c, 3.102 in methanol, $[\alpha]_D^{29} + 24.5 \pm 0.7°$ (c, 2.827 in ethyl acetate), $$\lambda_{max.}^{methanol} = 236 \ m\mu \ (\epsilon = 3,755)$$

Soluble in ethyl acetate, chloroform, methanol; slightly in ether; insoluble in petroleum ether, water.

*Analysis.*—Calcd. for $C_{25}H_{26}N_4O_7$: H, 5.31; N, 11.3. Found: C, 60.61; H, 5.45; N, 11.43.

EXAMPLE 11

*Preparation of carbobenzoxyglycyl-N(Im)-carbobenzoxy-L-histidyl-L-leucine methyl ester.*—To a solution of 0.477 gram of N(Im)-carbobenzoxy-L-histidyl-L-leucine methyl ester dihydrobromide in 20 millilitres of dichloromethane, there are added 5 millilitres of ice-cold 5% sodium bicarbonate with vigorous shaking at 0° C. The aqueous phase is saturated with sodium chloride and extracted with 10 millilitres-portions of dichloromethane. The extracts are combined with the organic solvent phase and evaporated in vacuo after drying over sodium sulfate. To the condensate, there is added a solution of 0.157 gram of carbobenzoxyglycine and 0.155 gram of N,N'-dicyclohexylcarbodiimide in 5 millilitres of dichloromethane. The resultant solution is stirred for 4 hours at room temperature (15 to 30° C.). The reaction mixture is concentrated in vacuo to about 10 millilitres and then allowed to stand overnight at a room temperature (15 to 30° C.). On ice-cooling, the precipitated dicyclohexylurea is filtered off and washed with dichloromethane. The washing and the filtrate are combined together and condensed in vacuo to afford a syrup. Adding 5 millilitres of ethyl acetate, the syrup is solidified. To the resultant solid, there are added 10 millilitres of ether and refrigerated. The precipitated crystals are collected by filtration. Yield, 0.371 gram. M.P. 147.5 to 149° C. Recrystallization from ethyl acetate gives a sample for analyses with M.P.

152 to 152.5° C., $[\alpha]_D^{30}$—9.2±1° (c, 2.062 in methanol), $$\lambda_{max.}^{methanol} = 236 \text{ m}\mu \ (\epsilon = 3,610)$$

Soluble in chloroform, methanol; sparingly in ethyl acetate; insoluble in ether, petroleum ether, water.

*Analysis.*—Calcd. for $C_{31}H_{37}N_5O_8$: C, 61.3; H, 6.14; N, 11.5. Found: C, 61.39; H, 6.31; N, 11.44.

EXAMPLE 12

*Preparation of carbobenzoxyglycyl-N(Im)-carbobenzoxy-L-histidyl-L-phenylalanine methyl ester.*—A suspension of 0.522 gram of N(Im)-carbobenzoxy-L-histidyl-L-phenylalanine methyl ester dihydrobromide in 20 millilitres of dichloromethane and 7.5 millilitres of water is cooled at 0° C. in an ice-bath. To the suspension, there is added 1 millilitre of 28% ammonia water with vigorous shaking. The aqueous phase is saturated with sodium chloride and shaken with 10 millilitres of dichloromethane. The dichloromethane extract is combined with the dichloromethane phase above separated, washed with a saturated aqueous solution of sodium chloride, and dried over anhydrous sodium sulfate at 0° C. In the thus-prepared solution of N(Im)-carbobenzoxy-L-histidyl-L-phenylalanine methyl ester in dichloromethane, there is dissolved 0.162 gram of carbobenzoxyglycine. Adding a solution of 0.160 gram of N,N'-dicyclohexylcarbodiimide in 5 millilitres of dichloromethane to the resultant mixture, there is precipitated dicyclohexylurea. The reaction mixture is allowed to stand overnight and then gently warmed at 40° C. Removing the dicyclohexylurea by filtration, the filtrate is refrigerated to crystallize the product as needles. Yield, 0.445 gram. M.P. 151 to 152° C. Recrystallization from dichloromethane gives fine needles with M.P. 154 to 154.9° C., $[\alpha]_D^{18}$—8.6±2° (c, 2.336 in methanol, $$\lambda_{max.}^{methanol} = 236 \text{ m}\mu \ (\epsilon = 3,655)$$

Soluble in warm dichloromethane; sparingly in dichloromethane, ethyl acetate, methanol; insoluble in ether, petroleum ether, water.

*Analysis.*—Calcd. for $C_{34}H_{35}N_5O_8$: C, 63.7; H, 5.51; N, 10.9. Found: C, 63.69; H, 5.63; N, 10.84.

EXAMPLE 13

*Preparation of formyl-γ-methyl-L-glutamyl-N(Im)-carbobenzoxy-L-histidyl-L-phenylalanine benzyl ester.*—To a suspension of 1.162 grams of N(Im)-carbobenzoxy-L-histidyl-L-phenylalanine benzyl ester monohydrochloride monohydrate in 10 millilitres of water and 20 millilitres of dichloromethane, 1 millilitre of 28% ammonia water is added with vigorous stirring under ice-cooling. The aqueous phase is extracted twice with dichloromethane. The dichloromethane phase and the dischloromethane extracts are combined together, washed with water, dried over anhydrous sodium sulfate and condensed in vacuo at a temperature below 20° C. Dichloromethane is again added to the condensate and the condensation is repeated. The resultant syrup is dissolved in 5 millilitres of acetonitrile and 10 millilitres of dichloromethane. To the resulting solution, there is added a solution of 0.417 gram of formyl-γ-methyl-L-glutamic acid in 20 millilitres of acetonitrile. Adding a solution of 0.455 gram of N,N'-dicyclohexylcarbodiimide in 5 millilitres of acetonitrile, there is separated a crystalline precipitate of N,N'-dicyclohexylurea. The reaction mixture is stirred at a room temperature (15 to 30° C.) to start the crystallization of the product within 1 hour. The stirring is continued for 3 hours. After ice-cooling, the precipitate is collected by filtration and redissolved in 20 millilitres of hot acetonitrile. Removing the insoluble N,N'-dicyclohexylurea carefully, the filtrate is allowed to stand at a room temperature (15 to 30° C.) and then refrigerated to complete the separation of the product. Yield, 1.215 grams. M.P. 165 to 165.5° C. (dec.). $[\alpha]_D^{24}$—12.1±3° (c, 2.032 in dimethylformamide).

$$\lambda_{max.}^{methanol} = 236 \text{ m}\mu \ (\epsilon = 3.415)$$

*Analysis.*—Calcd. for $C_{37}H_{39}N_5O_9$: C, 63.7; H, 5.63; N, 10.0. Found: C, 63.79; H, 5.90; N, 10.36.

EXAMPLE 14

*Preparation of N(α),N(Im)-discarbobenzoxy-L-histidyl-N(Im)-carbobenzoxy - L - histidyl-L-phenylalanine benzyl ester.*—A mixture of 0.423 gram of N(α), N(Im)-dicarbobenzoxy-L- histidine, N(Im)-carbobenzoxy-L-histidyl-L-phenylalanine benzyl ester (prepared from 0.70 gram of N(Im)-carbobenzoxy-L-histidyl-L-phenylalanine benzyl ester monohydrochloride monohydrate by treating with ammonia water in the presence of dichloromethane) and 0.206 gram of N,N'-dicyclohexylcarbodiimide in dichloromethane is stirred at a room temperature (15 to 30° C.) for 2.5 hours, allowed to stand overnight and then concentrated in vacuo. The resulting syrup is dissolved in about 5 to 6 millilitres of acetonitrile and, after removal of the insoluble dicyclohexylurea, the product is precipitated with addition of ether. Yield, 0.754 gram. M.P. 132 to 133° C. Recrystallization from ethyl acetate affords the fine crystal; M.P. 138 to 140° C., $[\alpha]_D^{22}$—17.9±2° (c, 3.047 in methanol), $$\lambda_{max.}^{methanol} = 236 \text{ m}\mu \ (\epsilon = 7,830)$$

Readily soluble in dichloromethane, hot ethyl acetate; soluble in acetonitrile, methanol; slightly in ether; insoluble in petroleum ether, water.

*Analysis.*—Calcd. for $C_{52}H_{49}N_7O_{10}$: C, 67.1; H, 5.79; N, 10.5. Found: C, 67.05; H, 5.41; N, 10.69.

EXAMPLE 15

*Preparation of carbobenzoxy-O-benzyl-L-seryl-N(Im)-carbobenzoxy-L-histidyl-L-leucine methyl ester.*—To a mixture of 0.576 gram of carbobenzoxy-O-benzyl-L-serine (Okawa: Bull. Chem. Soc. Japan, 29, page 488 (1956) and N(Im)-carbobenzoxy-L-histidyl-L-leucine methyl ester (prepared from 1.118 grams of N(Im)-carbobenzoxy-L-histidyl-L-leucine methyl ester (prepared from 1.118 grams of N(Im)-carbobenzoxyl-L-histidyl-L-leucine methyl ester dihydrobromide by treating with sodium bicarbonate in the presence of dichloromethane) in dichloromethane, there is added 0.362 gram of N,N'-dicyclohexylcarbodiimide. The resultant solution is stirred for 3 hours and allowed to stand overnight at a room temperature (15 to 30° C.). After removal of the insoluble dicyclohexylurea, the filtrate is concentrated in vacuo. The resulting syrup is redissolved in ethyl acetate, washed successively with N hydrochloric acid, water 5% sodium bicarbonate and water and, after drying over anhydrous sodium sulfate, concentrated to a syrup which is precipitated from ethyl acetate-ether to give 1.118 grams of the product. M.P. 102 to 105° C. Recrystallization from ethyl acetate gives a sample for analysis; M.P. 105 to 106° C., $[\alpha]_D^{30}$+7.8±1° (c, 1.990 in ethyl acetate).

*Analysis.*—Calcd. for $C_{39}H_{45}N_5O_9$: 64.3; H, 6.23; N, 9.62. Found: C, 64.04; H, 6.29; N, 9.51.

EXAMPLE 16

*Preparation of formylglycyl-O-benzyl-L-seryl-N(Im)-carbobenzoxy-L-histidyl-L-leucine methyl ester.*—O-benzyl-L-serine methyl ester (prepared from 1.81 grams of the hydrochloride by treating with potassium carbonate in ether) and 0.68 gram of formylglycine (Inouye et al.: Bull. Chem. Soc. Japan, 34, page 4 (1961)) are condensed by using N,N'-dicyclohexylcarbodiimide as a condensing agent in dichloromethane to afford 1.714 grams of formylglycyl-O-benzyl-L-serine methyl ester, which is readily saponified to formylglycyl-O-benzyl-L-serine in a 80 percent yield.

N(Im)-carbobenzoxy-histidyl-L-leucine methyl ester (prepared from 1.118 grams of N(Im)-carbobenzoxy-L- histidyl-L-leucine methyl ester dihydrobromide by treating with sodium bicarbonate in the presence of dichloromethane) and 0.491 gram of formylglycyl-O-benzyl-L-serine prepared above are coupled as in Example 15. Yield, 0.815 gram. Recrystallization from methanol affords needles with M.P. 131 to 132° C., $[\alpha]_D^{30}+1.6\pm1°$ (c, 2.046 in ethyl acetate).

*Analysis.*—Calcd. for $C_{34}H_{42}N_6O_9$: C, 60.1; H, 6.24; N, 12.35. Found: C, 59.85; H, 6.24; N, 12.32.

EXAMPLE 17

*Preparation of carbobenzoxy-L-prolyl-L-phenylalanyl-N(Im)-carbobenzoxy-L-histidyl-L-leucine methyl ester.*—Coupling of 2.49 grams of carbobenzoxy-L-proline (Inouye et al.: Bull. Chem. Soc. Japan, 34, p. 4 (1961)) with L-phenylalanine methyl ester (prepared from 2.59 grams of the hydrochloride by treating with potassium carbonate in ether) by using N,N'-dicyclohexylcarbodiimide in dichloromethane affords 4.362 grams of carbobenzoxy-L-prolyl-L-phenylalanine methyl ester as a syrup. The methanolic solution of the crude ester obtained above is shaken with 5 millilitres of 2 N sodium hydroxide for 1 hour to give 2.54 grams of carbobenzoxy-L-prolyl-L-phenylalanine (64.2% based on carbobenzoxy-L-proline), M.P. 131 to 132° C.

N(Im)-carbobenzoxy-L-leucine methyl ester (prepared from 1.39 grams of N(Im)-carbobenzoxy-L-histidyl-L-leucine methyl ester dihydrobromide by treating with sodium bicarbonate in the presence of dichloromethane) and 0.793 gram of carbobenzoxy-L-prolyl-L-phenylalanine prepared above are coupled as in Example 15 to afford carbobenzoxy-L-prolyl-L-phenylalanyl-N(Im)-carbobenzoxy-L-histidyl-L-leucine methyl ester. Yield, 1.267 grams. Recrystallization from acetone-ether gives a sample of analysis; M.P. 144.5 to 145° C. (dec), $[\alpha]_D^{24}-56.4\pm1°$ (c, 2.544 in methanol).

*Analysis.*—Calcd. for $C_{43}H_{50}N_6O_9$: C, 65.1; H, 6.35; N, 10.6 Found: C, 64.42; H, 6.47; N, 10.71.

EXAMPLE 18

*Preparation of glycyl-N(Im)-carbobenzoxy-L-histidyl-L-phenylalanine methyl ester dihydrobromide.*—The treatment of 0.642 gram of carbobenzoxyglycyl-N(Im)-carbobenzoxy-L-histidyl-L-phenylalanine methyl ester with 3 millilitres of 37.5% (by weight) hydrogen bromide in dioxane as in Example 7 affords 0.421 gram of the product, $$\lambda_{max.}^{methanol}=234\ m\mu\ (=3{,}640)$$

*Analysis.*—Calcd. for $C_{26}H_{31}N_5O_6Br_2$: C, 46.7; H, 4.68; N, 10.0; Br, 23.9. Found: C, 45.73; H, 4.99; N, 10.40; Br, 22.59.

EXAMPLE 19

*Preparation of carbobenzoxyglycyl-L-histidyl-L-phenylalanine.*—To a suspension of 0.642 gram of carbobenzoxyglycyl-N(Im)-carbobenzoxy-L-histidyl-L-phenylalanine methyl ester in 15 millilitres of methanol, there are added 2.2 millilitres of N sodium hydroxide, and the resultant mixture is shaken at a room temperature (15 to 30° C.) for 30 minutes. The resulting clear solution is allowed to stand for additional 30 minutes, cooled in an ice bath, neutralized with 2.2 millilitres of N hydrochloric acid and then concentrated in vacuo to dryness. The crystalline residue is washed with ice-cold water and dried. Yield, 0.360 gram. M.P. 200° C. (dec.). $[\alpha]_D^{30}+15.4\pm1.4°$ (c, 1.424 in methanol).

*Analysis.*—Calcd. for $C_{25}H_{27}N_5O_6$: C, 60.85; H, 5.52; N, 14.2. Found: C, 60.51; H, 5.65; N, 14.11.

EXAMPLE 20

*Preparation of formyl-γ-methyl-L-glutamyl-L-histidyl-L-phenylalanine.*—A suspension of 0.349 gram of formyl-γ-methyl-L-glutamyl-N(Im)-carbobenzoxy-L-histidyl-L-phenylalanine benzyl ester in 20 millilitres of methanol is subjected to hydrogenation in the presence of palladium black catalyst at a room temperature (15 to 30° C.). After the crystal is completely dissolved, the hydrogenation is continued for additional 8 hours. The catalyst is filtered off and the filtrate is concentrated in vacuo. The resulting syrup is dissolved in water. After removal of the insoluble precipitate, the aqueous solution is concentrated in vacuo. Crystallization is effected by repeated concentration with dichloromethane. The product is filtered off, washed with dichloromethane and dried. Yield, 0.212 gram. M.P. 185 to 189° C. (dec.). $[\alpha]_D^{25}-12.2\pm2°$ (c. 2.210 in methalol).

*Analysis.*—Calcd. for $C_{22}H_{27}N_5O_7\cdot 2H_2O$: C, 51.9; H, 6.13; N, 13.7. Found: C, 51.28; H, 5.77; N, 13.48.

EXAMPLE 21

*Preparation of carbobenzoxy-γ-t-butyl-L-glutamyl-N(Im)-carbobenzoxy-L-histidyl-L-phenylalanine methyl ester.*—A solution of carbobenzoxy-γ-t-butyl-L-glutamic acid (prepared from 2.50 grams of the dicyclohexylammonium salt by treating with Dowex–50 ($H^+$–form)) in dichloromethane is mixed with a solution of N(Im)-carbobenzoxy-L-histidyl-L-phenylalanine methyl ester (prepared from 3.25 grams of the dihydrobromide as in Example 10) in dichloromethane. To the resultant solution, there is added 1.00 gram of N,N'-dicyclohexylcarbodiimide, and the total volume is made to about 30 millilitres by the addition of dichloromethane. The mixture is allowed to stand overnight at a room temperature (15 to 30° C.). After refrigeration, the precipitated dicyclohexylurea is filtered off and the filtrate is concentrated to dryness in vacuo to afford a solid mass which is washed with ethyl acetate and dried. Yield, 3.37 grams. Recrystallization from acetonitrile gives 3.17 grams of the pure crystals. M.P. 133 to 135° C. and 161 to 162° C. $[\alpha]_D^{24}-11.6\pm1°$ (c, 1.557 in dimethylformamide).

*Analysis.*—Calcd. for $C_{41}H_{47}N_5O_{10}$: C, 64.0; H, 6.15; N, 9.10. Found: C, 63.94; H, 6.21; N, 9.18.

EXAMPLE 22

*Preparation of carbobenzoxy-γ-t-butyl-L-glutamyl-L-histidyl-L-phenylalanine.*—To a suspension of 0.77 gram of carbobenzoxy-γ-t-butyl-L-glutamyl-N(Im)-carbobenzoxy-L-histidyl-L-phenylalanine methyl ester in 10 millilitres of methanol, there are added 2.2 millilitres of N sodium hydroxide at 0° C., and the mixture is shaken at a room temperature (15 to 30° C.) for 15 minutes and then cooled in an ice-bath. After addition of about 20 millilitres of water, the solution is neutralized with 2.2 millilitres of N hydrochloric acid to separate the product as a partially crystallized solid. The precipitate is collected by filtration, washed with cold water and dried. Yield, 0.585 gram. The suspension of this crude product in 20 millilitres of acetonitrile is boiled for a few minutes to induce complete crystallization. After refrigeration, the crystal is collected by filtration, washed with acetonitrile and then ether, and dried. Yield, 0.445 gram. M.P. 172 to 173° C.

The above-prepared histidine peptides may be intermediates in the synthesis of naturally-existing polypeptides having biological activities. For instance, the Glu-His-Phe (glutamylhistidylphenylalanine) sequence in formyl-γ-methyl-L-glutamyl-L-histidyl-L-phenylalanine, prepared in Example 20, is common to corticotropin and α-MSH. The Gly-Ser-His-Leu (glycylserylhistidylleucine) sequence of formylglycyl-O-benzyl-L-seryl-N(Im)-carbobenzoxy-L-histidyl-L-leucine methyl ester, prepared in Example 16, and the Pro-Phe-His-Leu (prolylphenyl-alanyl-histidylleucine) sequence of carbobenzoxy-L-prolyl-L-phenylalanyl-N(Im)-carbobenzoxy-L-histidyl-L-leucine methyl ester, prepared in Example 17, exist in insulin and hypertensin I, respectively. Further, the above-prepared histidine peptides are useful as the starting materials for the preparation of the artificial polypeptides having biological activities. For instance, carbobenzoxy-γ-t-butyl-L-glutamyl-L-histidyl-L-phenyl-alanine, prepared in Example 22, is coupled with G-tosyl-L-arginyl-L-tryptophyl-glycine methyl ester (Schnabel et al.: J. Am. Chem.

Soc., 82, page 4576 (1960)) in the presence of a condensing agent such as N,N'-dicyclohexylcarbodiimide to carbobenzoxy-γ-t-butyl-L-glutamyl-L-histidyl - L - phenylalanyl-G-tosyl-L-arginyl-L-tryptophyl-glycine methyl ester, which is subjected to elimination of the protecting radicals according to the conventional manner. The thus-obtained L-glutamyl-L-histidyl-L-phenylalanyl-L-arginyl-L-tryptophyl-glycine may reasonably have a CRF (corticotropin releasing factor) activity, because of its close similarity in structure to a known active hexapeptide, L-glutaminyl-L-histidyl-L-phenylalanyl-L-arginyl-L - tryptophyl-glycine (De Garilhe et al.: Experientia, 16, page 414 (1960)). Alternatively, carbobenzoxy-γ-t-butyl-L-glutamyl-L-histidyl-L-phenylalanyl-G-tosyl-L-arginyl - L - tryptophyl-glycine methyl ester may be catalytically reduced using a palladium catalyst and the resultant γ-t-butyl-L-glutamyl-L-histidyl-L-phenylalanyl-G-tosyl-L-arginyl - L - tryptophyl-glycine methyl ester is coupled with carbobenzoxy-L-methionine in the presence of a condensing agent such as N,N'-dicyclohexylcarbodiimide, followed with the elimination of the protecting radicals in the conventional manner, to afford L-methionyl-L-glutamyl-L-histidyl-L-phenylalanyl-L-arginyl - L - tryptophyl-glycine. This heptapeptide has been known to have a melanocyte-stimulating activity and a CRF activity (Li et al.: Nature, 189, page 143 (1961)).

What we claim is:

1. A process which comprises treating a N(α),N(Im)-dicarbobenzoxy histidine compound of the formula:

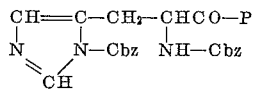

wherein Cbz is carbobenzoxy and P is a member selected from the group consisting of lower alkoxy, phenyl(lower)alkoxy, nitrophenyl(lower)alkoxy and a radical of the formula: —NH—Q''—CO—P' wherein P' is a member selected from the group consisting of lower alkoxy, phenyl (lower)alkoxy and nitrophenyl(lower)alkoxy and Q'' is a member selected from the group consisting of amino carboxylic acid residue and a peptide residue with hydrogen bromide in a substantially anhydrous organic solvent medium at a temperature between 15 and 30° C. to obtain a N(Im)-carbobenzoxy histidine compound dihydrobromide of the formula:

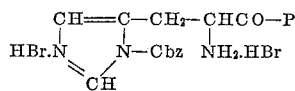

wherein Cbz and P are as aforedefined.

2. A N(Im)-carbobenzoxy histidine compound dihydrobromide of the formula:

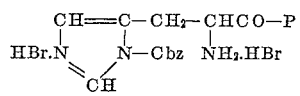

wherein Cbz is carbobenzoxy and P is a member selected from the group consisting of lower alkoxy, phenyl(lower) alkoxy, nitrophenyl(lower)alkoxy and a radical of the formula

—NH—Q''—P' wherein P' is a member selected from the group consisting of lower alkoxy and phenyl(lower)alkoxy and Q'' is a member selected from the group consisting of L-leucine residue and L-phenylalanine residue.

3. N(Im)-Carbobenzoxy-L-histidine methyl ester dihydrobromide.

4. N(Im)-Carbobenzoxy-L-histidyl-L-leucine methyl ester dihydrobromide.

5. N(Im)-Carbobenzoxy-L-histidyl - L - phenylalanine methyl ester dihydrobromide.

6. N(Im)-Carbobenzoxy-L-histidyl - L - phenylalanine benzyl ester dihydrobromide.

7. A N(Im)-carbobenzoxy histidine peptide represented by the formula:

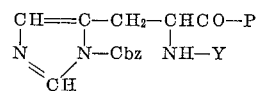

wherein Cbz represents a carbobenzoxy, P is a member selected from the group consisting of a lower alkoxy, a phenyl(lower)alkoxy, a nitrophenyl(lower)alkoxy and a radical represented by the formula

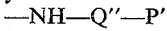
—NH—Q''—P' wherein P' is a member selected from the group consisting of lower alkoxy and phenyl(lower)alkoxy and Q'' is a member selected from the group consisting of L-leucine residue and L-phenylalanine residue and Y is a member selected from the group consisting of carbobenzoxyglycyl, formyl-γ-methyl-L-glutamyl, N(α),N(Im)-dicarbobenzoxy-L-histidyl, carbobenzoxy-O-benzyl-L-seryl, formylglycyl - O - benzyl-L-seryl, carbobenzoxy-L-prolyl-L-phenylalanyl and carbobenzoxy-γ-t-butyl-L-glutamyl.

8. Carbobenzoxyglycyl-N(Im)-carbobenzoxy-L - histidine methyl ester.

9. Carbobenzoxyglycyl-N(Im)-carbobenzoxy-L - histidyl-L-leucine methyl ester.

10. Carbobenzoxyglycyl-N(Im)-carbobenzoxy-L-histidyl-L-phenylalanine methyl ester.

11. Formyl-γ-methyl-L-glutamyl-N(Im)-carbobenzoxy-L-histidyl-L-phenylalanine benzyl ester.

12. N(α),N(Im)-Dicarbobenzoxy-L-histidyl - N(Im) - carbobenzoxy-L-histidyl-L-phenylalanine benzyl ester.

13. Carbobenzoxy-O-benzyl-L-seryl-N(Im)-carbobenzoxy-L-histidyl-L-leucine methyl ester.

14. Formylglycyl-O-benzyl-L-seryl-N(Im)-carbobenzoxy-L-histidyl-L-leucine methyl ester.

15. Carbobenzoxy - L - prolyl - L-phenylalanyl-N(Im)-carbobenzoxy-L-histidyl-L-leucine methyl ester.

16. Carbobenzoxy-γ-t-butyl-L-glutamyl-N(Im)-carbobenzoxy-L-histidyl-L-phenylalanine methyl ester.

17. Glycyl - N(Im)-carbobenzoxy-L-histidyl-L-phenylalanine methyl ester dihydrobromide.

18. Carbobenzoxyglycyl-L-histidyl-L-phenylalanine.

19. Formyl - γ-methyl-L-glutamyl-L-histidyl-L-phenylalanine.

20. Carbobenzoxy-γ-t-butyl-L-glutamyl-L-histidyl - L - phenylalanine.

References Cited by the Examiner

UNITED STATES PATENTS

| | | | |
|---|---|---|---|
| 2,978,444 | 4/1961 | Schwyzer | 260—112 |
| 3,014,023 | 12/1961 | Schwyzer | 260—112.5 |
| 3,072,723 | 1/1963 | Brenner | 260—112.5 |

OTHER REFERENCES

Akabori et al.: Nature, vol. 181, pp. 772–773 (1958).

LEWIS GOTTS, *Primary Examiner.*

LEON ZITVER, ELBERT L. ROBERTS, *Examiners.*

DENNIS P. CLARKE, PERRY A. STITH,
*Assistant Examiners.*